United States Patent Office 3,645,869
Patented Feb. 29, 1972

3,645,869
PREPARATION OF A FIBROUS THERMOPLASTIC COPOLYMER OF COTTON AND STYRENE BY RADIATION TREATMENT
Jett C. Arthur, Jr., Metairie, La., assignor to the United States of America as represented by the Secretary of Agriculture
No Drawing. Continuation-in-part of application Ser. No. 320,969, Nov. 1, 1963. This application Jan. 10, 1968, Ser. No. 696,711
Int. Cl. B01j 1/00, 1/12; C08d 9/06
U.S. Cl. 204—159.12                                3 Claims

ABSTRACT OF THE DISCLOSURE

This invention relates to the treatment of cotton with styrene monomer dissolved in an essentially anhydrous solvent and then to the radiation copolymerization of the styrene monomer with fibrous cotton cellulose and has as its objects modifications of the physical properties of cotton, particularly imparting thermoplasticity, decreasing stiffness, increasing elongation-at-break, increasing resistance to wetting with water, and changing other related properties of cotton fibers to impart new and desirable properties for use in finished cotton products.

A non-exclusive, irrevocable, royalty-free license in the invention herein described, throughout the world for all purposes of the United States Government, with the power to grant sublicenses for such purposes, is hereby granted to the Government of the United States of America.

This application is a continuation-in-part of Ser. No. 320,969, filed Nov. 1, 1963, now abandoned.

In recent years the utilization of cotton in textiles and other products has been significantly enhanced by chemical modifications of the physical and chemical properties of cotton fibers to impart new and desirable properties. In effecting chemical modifications of cotton, due to low chemical reactivity of cotton cellulose, concentrated bases, high temperatures, high pressures, or catalysts are used. Generally, in many of the treatments in order to achieve the desired change or improvement in properties of cotton, other, and not always desirable, changes in properties occur.

In another process styrene monomer is applied to cellulosic products under very mild conditions and the small molecules of the monomer allowed to penetrate the product. Then when the treated product is irradiated with high energy ionizing radiation the styrene is polymerized to form high molecular weight polymer within the product. However, when the cellulosic product is high grade cotton cellulose, having a high degree of polymerization, very little polymerization of the styrene occurs. It has been reported that about 63 electron volts of radiant energy are required to produce a free radical of styrene. The aromatic ring in styrene probably tends stabilize the molecule, resulting in a low efficiency of free radical yield. It can be calculated from data previously published that at a dosage of about 1 megaroentgen, in an oxygen atmosphere, about 14 electron volts of radiant energy are required per scission of the cotton cellulose molecule, excessive scissioning leading to loss of fibrous structure. Obviously, then if significant copolymerization of styrene monomer with cotton is to be initiated by high energy radiation and at the same time the fibrous structure of cotton is to be retained, the efficiency of the radiochemical yield for activated styrene must be increased.

Our present invention is an improvement over these processes in that the styrene monomer is dissolved in a solvent which is essentially anhydrous and which has a high free radical yield or irradiation. The amount of water present in any case should be no more than about 0.1% by weight. Then this solution of styrene monomer and solvent is applied to cotton cellulose. On irradiation of the treated cotton with high energy ionizing radiation, free radicals are formed in the solvent. Then unexpectedly, apparently through an energy transfer process, a high yield of free radicals is obtained in the styrene monomer, leading to copolymerization of styrene and cotton, giving products with new and useful properties.

We have also unexpectedly discovered that the presence of radiation-excited cotton cellulose apparently increased the rate of free radical formation of styrene, and consequently the rate of copolymerization of styrene monomer with cotton cellulose. It was known that the cellulose molecule was less stable to high-energy radiation than styrene. After interaction with high energy radiation, the excited cellulose molecular probably reacted with the more stable styrene, transferring sufficient energy to initiate free radical formation and subsequent copolymerization of the styrene monomer with the cotton cellulose. It was also determined that there was an optimum ratio of cotton cellulose to styrene monomer in an appropriate solvent for maximum yield of copolymer of cotton and styrene. This unexpected discovery could be termed an indirect effect of the cotton cellulose polymer.

We have further unexpectedly discovered that, by the selection of a solvent which would dissolve the styrene monomer and would interact with the cotton cellulose, copolymers of styrene monomer and cotton cellulose could be formed by radiation treatment with the polystyrene being located uniformly within the growth layers of the cotton fiber. This is particularly advantageous in preparing a fibrous, thermoplastic copolymer of cotton and styrene, which is resistant to separation by exhaustive extraction with polymer solvent.

For example, a treated, irradiated cotton cellulose fiber, containing about 44 percent graft copolymer of polystyrene, exhibited decreasing stiffness with increasing temperature, becoming soft and extensible and passing through a second-order transition temperature. The polystyrene copolymer was located within the growth layers of the cotton fiber. The product retained the basic appearance and properties of cotton. Untreated cotton cellulose did not have these thermoplastic properties. In cotton products requiring thermoplasticity, the cotton cellulose and styrene copolymers prepared by radiation treatment would have particular and important values.

The following examples illustrate our invention in greater detail:

EXAMPLE 1

Cotton fiber yarn (1 part) was immersed in a solution (10 parts) of styrene monomer (70%)-methanol (30%) and irradiated at room temperature to dosages ranging from zero to 10,000,000 roentgens by high energy gamma ionizing radiation from radioactive cobalt-60 to form a copolymer of cotton cellulose and styrene. The methanol was essentially anhydrous (i.e., no more than 0.1% of water by weight). Although loosely adhering polystyrene was not evident, the copolymer was extracted overnight at 25° C. with benzene to remove any loosely bound polystyrene and styrene monomer; then successively washed with methanol and water and dried in a current of air at room temperature. The effects of variation in the dosage of radiation on the composition of the copolymer and the relationship of this composition to breaking strength, elongation-at-break, yarn number, breaking toughness, and average stiffness of the copolymer are shown in Table I.

TABLE I.—EFFECT OF RADIATION DOSAGE ON THE COMPOSITION OF THE COPOLYMER OF COTTON AND STYRENE AND ON ITS PROPERTIES [1]

| Dosage, mega-roentgen | Copolymer composition,[2] percent | | Breaking strength, lb. | Elongation at break, percent | Yarn No., tex. | Breaking toughness, g./tex. | Avg. stiffness, g./tex. |
| --- | --- | --- | --- | --- | --- | --- | --- |
| | Cotton | Polystyrene | | | | | |
| 0.0 | 100 | 0 | 9.9 | 13 | 232 | 0.81 | 152 |
| 0.2 | 87 | 13 | 8.5 | 12 | 285 | 0.55 | 111 |
| 0.4 | 81 | 19 | 8.4 | 12 | 298 | 0.51 | 109 |
| 0.6 | 77 | 23 | 8.4 | 12 | 334 | 0.49 | 92 |
| 0.8 | 73 | 27 | 7.9 | 14 | 343 | 0.47 | 75 |
| 1.0 | 69 | 31 | 7.7 | 13 | 360 | 0.45 | 74 |
| 1.2 | 67 | 33 | 7.7 | 15 | 383 | 0.46 | 61 |
| 1.5 | 63 | 37 | 7.8 | 17 | 404 | 0.49 | 53 |
| 2.0 | 61 | 39 | 7.5 | 18 | 451 | 0.50 | 41 |
| 3.0 | 55 | 45 | 6.6 | 27 | 562 | 0.57 | 20 |
| 4.0 | 43 | 57 | 6.2 | 32 | 820 | 0.48 | 11 |
| 10.0 | 38 | 62 | 5.0 | 27 | 1001 | 0.24 | 8 |

[1] Weight ratio of styrene (70%)-methanol (30%) solution to cotton is 10:1.
[2] After benzene extraction.

EXAMPLE 2

Cotton fiber yarn (1 part) was immersed in a solution (10 parts) of styrene monomer and solvent, either methanol or N,N-dimethylformamide, the composition of the solution being varied from zero percent solvent to 100 percent solvent and from 100 percent styrene to zero percent styrene. The solvent employed was essentially anhydrous (i.e., no more than about 0.1% of water by weight). The mixture of cotton and solution was irradiated to a dosage of 1,000,000 roentgens by high energy gamma ionizing radiation from radioactive cobalt-60 to form a copolymer of cotton cellulose and styrene. Then the treated yarn was extracted with benzene and dried as in Example 1. The effects of variation in the concentration of methanol and N,N-dimethylformamide, compounds having high radiochemical yields of free radicals, on the composition of the copolymer of cotton cellulose and styrene are shown in Table II.

TABLE II.—EFFECT OF FREE RADICAL YIELDING SOLVENTS ON RADIATION ON THE COMPOSITION OF THE COPOLYMER OF COTTON AND STYRENE [1]

| Composition of solution, percent | | Copolymer composition,[2] percent | | | |
| --- | --- | --- | --- | --- | --- |
| | | Methanol solvent | | N,N-dimethylformamide solvent | |
| Styrene | Solvent | Cotton | Polystryene | Cotton | Polystyrene |
| 100 | 0 | 100 | 0 | 100 | 0 |
| 99 | 1 | 96 | 4 | 98 | 2 |
| 98 | 2 | 68 | 32 | 92 | 8 |
| 97 | 3 | 69 | 31 | 77 | 23 |
| 85 | 15 | 72 | 28 | 70 | 30 |
| 70 | 30 | 70 | 30 | 69 | 31 |
| 50 | 50 | 71 | 29 | 77 | 23 |
| 33 | 67 | 74 | 26 | 88 | 12 |
| 15 | 85 | 86 | 14 | 98 | 2 |
| 0 | 100 | 100 | 0 | 100 | 0 |

[1] Radiation dosage: 1,000,000 roentgens; weight ratio of solution to cotton is 10:1.
[2] After benzene extraction.

EXAMPLE 3

Cotton fiber yarn was immersed in an essentially anhydrous solution of styrene (70%)-methanol (30%); and the mixture was irradiated to a dosage of 1,000,000 roentgens by high energy gamma ionizing radiation from radioactive cobalt-60 to form a copolymer of cotton cellulose and styrene. Then the treated yarn was extracted with benzene and dried as in Example 1. The effects of variation in relative concentration of solution and cotton cellulose (which has a high radiochemical free radical yield as compared with styrene) on the composite of the copolymer of cotton cellulose and styrene are shown in Table III.

TABLE III.—EFFECT OF CELLULOSE ON THE COMPOSITION OF THE COPOLYMER ON COTTON AND STYRENE [1]

| Solution/cotton, wt. ratio | Copolymer composition,[2] percent | |
| --- | --- | --- |
| | Cotton | Polystyrene |
| 1 | 100 | 0 |
| 2 | 96 | 4 |
| 3 | 90 | 10 |
| 5 | 73 | 27 |
| 10 | 72 | 28 |
| 20 | 71 | 29 |
| 50 | 71 | 29 |
| 100 | 71 | 29 |

[1] Solution: styrene (70%)-methanol (30%); radiation dosage: 1,000,000 roentgens.
[2] After benzene extraction.

EXAMPLE 4

Cotton fiber yarn (1 part) was immersed in an essentially anhydrous solution (10 parts) of styrene monomer-(70%)-methanol (30%); and the mixture was irradiated to a dosage of 1,000,000 roentgens by high energy ionizing radiation from radioactive cobalt-60 to form a copolymer of cotton and styrene. Then the treated yarn was extracted with benzene and dried as in Example 1, giving a copolymer containing about 70% cotton and 30% polystyrene. The resistance of wetting with water was greatly improved; for example, purified cotton yarn was wet out almost instantaneously with distilled water, while a sample of the copolymer yarn required more than 1500 seconds to wet out.

EXAMPLE 5

A copolymer of 70% cotton and 30% polystyrene was prepared as in Example 4. The stiffness of the copolymer yarn decreased with increasing temperature over the range 21° to 200° C. The copolymer yarn became soft and extensible, passing through a second-order transition temperature at about 100° C., indicating that a thermoplastic cotton product had been prepared. The stiffness of untreated cotton yarn decreased only slightly with increasing temperature over the range 21° to 200° C.

The recommendation that solvents and solutions be essentially anhydrous must be adhere to since this process is sensitive to the presence of moisture. The initial rate of decay of free radicals in irradiated cellulose is directly related to absolute humidity. For example, cellulose exposed to nitrogen having 60% relative humidity prior to irradiation at a dosage of $2.6 \times 10^{19}$ e.v./g. had a concentration of free radicals of about $3 \times 10^{17}$ spins/g. When the cellulose was irradiated dry to the same dosage and then exposed to nitrogen having 60% relative humidity, the concentration of free radicals was about $5 \times 10^{17}$ spins/g.

I claim:
1. A process for producing a thermoplastic, textile copolymer of cotton and styrene comprising irradiating at room temperature and to a dosage of about from 0.2 to

10.0 megaroentgens, a solution containing about from 30 to 98 weight percent of styrene monomer in a solvent selected from the group consisting of methanol and N,N-dimethylformamide, said solution being essentially anhydrous and containing, in addition to styrene monomer and solvent, fibrous cotton in the amount of one part by weight of cotton to at least five parts by weight of solution, and extracting the resulting copolymer of cotton and styrene with benzene to remove any loosely-bound polystyrene and styrene monomer.

2. The process of claim 1 wherein the irradiation dosage is at least about 1.0 megaroentgen, the amount of styrene monomer in solution is about from 30 to 90 weight percent, and the solvent is essentially anhydrous methanol.

3. The process of claim 1 wherein the irradiation dosage is at least about 1.0 megaroentgen, the amount of styrene monomer in solution is about from 50 to 97 weight percent, and the solvent is essentially anhydrous N,N-dimethylformamide.

References Cited

UNITED STATES PATENTS 2,998,329    8/1961    Sovish et al. _____ 204—159.12

OTHER REFERENCES

Sakurata et al., Graft Polymerization of Styrene to Cotton Induced by Pre-Irradiation by Electron Beam, annual report of the Japanese Assoc. for Radiation Research on Polymers, vol. I, Oct. 10, 1960, pp. 105–109.

Chapiro et al., Direct Radiation Grafting on to Hydrophilic Polymers, Intl. J. of Applied Radiation and Isotopes, vol. 8, pp. 164–167 (1960).

MURRAY TILLMAN, Primary Examiner

R. B. TURER, Assistant Examiner

U.S. Cl. X.R.

8—116; 260—17.4 CL, 17.4 GC